United States Patent
Klein et al.

(10) Patent No.: US 9,363,381 B2
(45) Date of Patent: Jun. 7, 2016

(54) METHOD AND SYSTEM FOR TRANSFERRING A CALL BETWEEN DEVICES OF A SINGLE USER

(71) Applicant: MOTOROLA SOLUTIONS, INC, Schaumburg, IL (US)

(72) Inventors: David E. Klein, Davie, FL (US); Eric D. Brooks, Coral Springs, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/220,877

(22) Filed: Mar. 20, 2014

(65) Prior Publication Data

US 2015/0271339 A1  Sep. 24, 2015

(51) Int. Cl.
| | |
|---|---|
| *H04M 3/54* | (2006.01) |
| *H04W 4/10* | (2009.01) |
| *H04W 36/00* | (2009.01) |
| *H04W 4/16* | (2009.01) |
| *H04W 4/22* | (2009.01) |
| *H04W 76/00* | (2009.01) |

(Continued)

(52) U.S. Cl.
CPC .............. *H04M 3/543* (2013.01); *H04W 36/00* (2013.01); *H04W 4/10* (2013.01); *H04W 4/16* (2013.01); *H04W 4/22* (2013.01); *H04W 12/02* (2013.01); *H04W 76/005* (2013.01); *H04W 76/007* (2013.01); *H04W 88/06* (2013.01)

(58) Field of Classification Search
None
See application file for complete search history.

(56) References Cited

U.S. PATENT DOCUMENTS

| 6,125,176 A | 9/2000 | Foladare |
| 8,010,158 B2 | 8/2011 | Parkkinen |

(Continued)

FOREIGN PATENT DOCUMENTS

| CA | 2654538 C | 1/2013 |
| EP | 2 409 229 A2 | 1/2012 |

(Continued)

OTHER PUBLICATIONS

Sprint—Kyocera Torque—extracted from: "http://support.sprint.com/global/pdf/user_guides/kyocera/torque/kyocera_torque_ug.pdf"—"Phone Calls—Call Emergency Numbers"—pp. 36-37—Copyright 2013 Sprint and Logo "Kyocera".

(Continued)

*Primary Examiner* — Daniel Lai (57) ABSTRACT

A method and device enables transferring a call between devices of a single user. The method comprises pairing, over a master-less communication link, a narrowband communication device operating in a narrowband communication system and a broadband communication device operating in a broadband communication system. A radio identifier is shared between the narrowband communication device and the broadband communication device, enabling call details to be transferred between the narrowband communication device and the broadband communication device. An operational status of either the narrowband communication device or the broadband communication device is then evaluated. When a call associated with particular call details is prior established on both the narrowband communication system and the broadband communication system, the call can be transferred, using the radio identifier and the call details, and based on the operational status, from one to the other of the broadband communication device and the narrowband communication device.

21 Claims, 4 Drawing Sheets

(51) Int. Cl.
*H04W 88/06* (2009.01)
*H04W 12/02* (2009.01)

(56) References Cited

U.S. PATENT DOCUMENTS

| | | |
|---|---|---|
| 8,483,101 B2 | 7/2013 | Albert |
| 8,504,090 B2 | 8/2013 | Klein |
| 8,548,145 B2 | 10/2013 | White |
| 8,559,874 B2 | 10/2013 | Kermoian |
| 2009/0052714 A1 | 2/2009 | Wilbur et al. |
| 2009/0094325 A1 | 4/2009 | Karia |
| 2009/0323655 A1 | 12/2009 | Cardona et al. |
| 2009/0323973 A1 | 12/2009 | Dyba |
| 2010/0137015 A1 | 6/2010 | Blanco |
| 2011/0237217 A1* | 9/2011 | Monks et al. .......... 455/404.1 |
| 2011/0237287 A1* | 9/2011 | Klein et al. ................ 455/521 |
| 2011/0238726 A1 | 9/2011 | Klein |
| 2013/0021176 A1 | 1/2013 | Tu |
| 2013/0117457 A1* | 5/2013 | Allen et al. ................. 709/227 |
| 2013/0244714 A1 | 9/2013 | Klein |
| 2013/0300817 A1 | 11/2013 | Naidu |
| 2015/0148088 A1* | 5/2015 | Ericson ....................... 455/501 |
| 2015/0319298 A1 | 11/2015 | Corretjer et al. |

FOREIGN PATENT DOCUMENTS

| | | |
|---|---|---|
| EP | 2409228 A1 | 1/2012 |
| EP | 2 424 198 A2 | 2/2012 |
| EP | 2 464 166 A1 | 6/2012 |
| GB | 2505000 A | 2/2014 |
| WO | 2007051489 A1 | 5/2007 |
| WO | 2013/098262 A1 | 7/2013 |
| WO | 2013/182113 A2 | 12/2013 |

OTHER PUBLICATIONS

Corresponding International Application, PCT/US2015/017917, International Search Report with written opinion, mailed Jun. 15, 2015.
International Search Report and Written Opinion for corresponding International Patent Application No. PCT/US2015/026579, mailed on Jul. 6, 2015.

* cited by examiner

METHOD AND SYSTEM FOR TRANSFERRING A CALL BETWEEN DEVICES OF A SINGLE USER

BACKGROUND OF THE INVENTION

Public safety personnel, such as police officers, firefighters, paramedics and the like typically utilize numerous communication devices while working in the field. Public safety communication devices include, for example, mobile radios such as handheld radios and/or vehicular radios along with remote accessories, such as remote microphones, speakers, earpieces, headsets and the like. These primary, mission critical devices and the infrastructure to support their operation are typically realized in the form of a narrowband system operating via a private network governed by a public safety agency.

Further, public safety personnel often carry additional non-mission critical devices, such as cell phones, personal digital assistants, electronic notepads and the like which operate over a broadband system. These secondary, non-mission critical devices are often used to monitor radio channels that are in addition to radio channels monitored using the primary, mission critical devices.

However, responding to calls that are monitored and received on the broadband system can be problematic, as non-mission critical broadband devices often have significant limitations regarding audio and radio frequency capabilities.

Accordingly, there is a need for an improved communication method and system for transferring a call between devices of a single user.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to some embodiments, the invention is a method for transferring a call between devices of a single user. The method comprises pairing, over a master-less communication link, a narrowband communication device operating in a narrowband communication system and a broadband communication device operating in a broadband communication system. A radio identifier is shared between the narrowband communication device and the broadband communication device, enabling call details to be transferred between the narrowband communication device and the broadband communication device. The call is then established on both the narrowband communication system and the broadband communication system. A trigger signal is then processed indicating that the call is to be transferred from one to the other of the broadband communication device and the narrowband communication device. Next, in response to the trigger signal, an operational status of either the narrowband communication device or the broadband communication device is evaluated. The call then can be transferred, using the radio identifier and the call details, and based on the operational status, from one to the other of the broadband communication device and the narrowband communication device.

Figure 1:
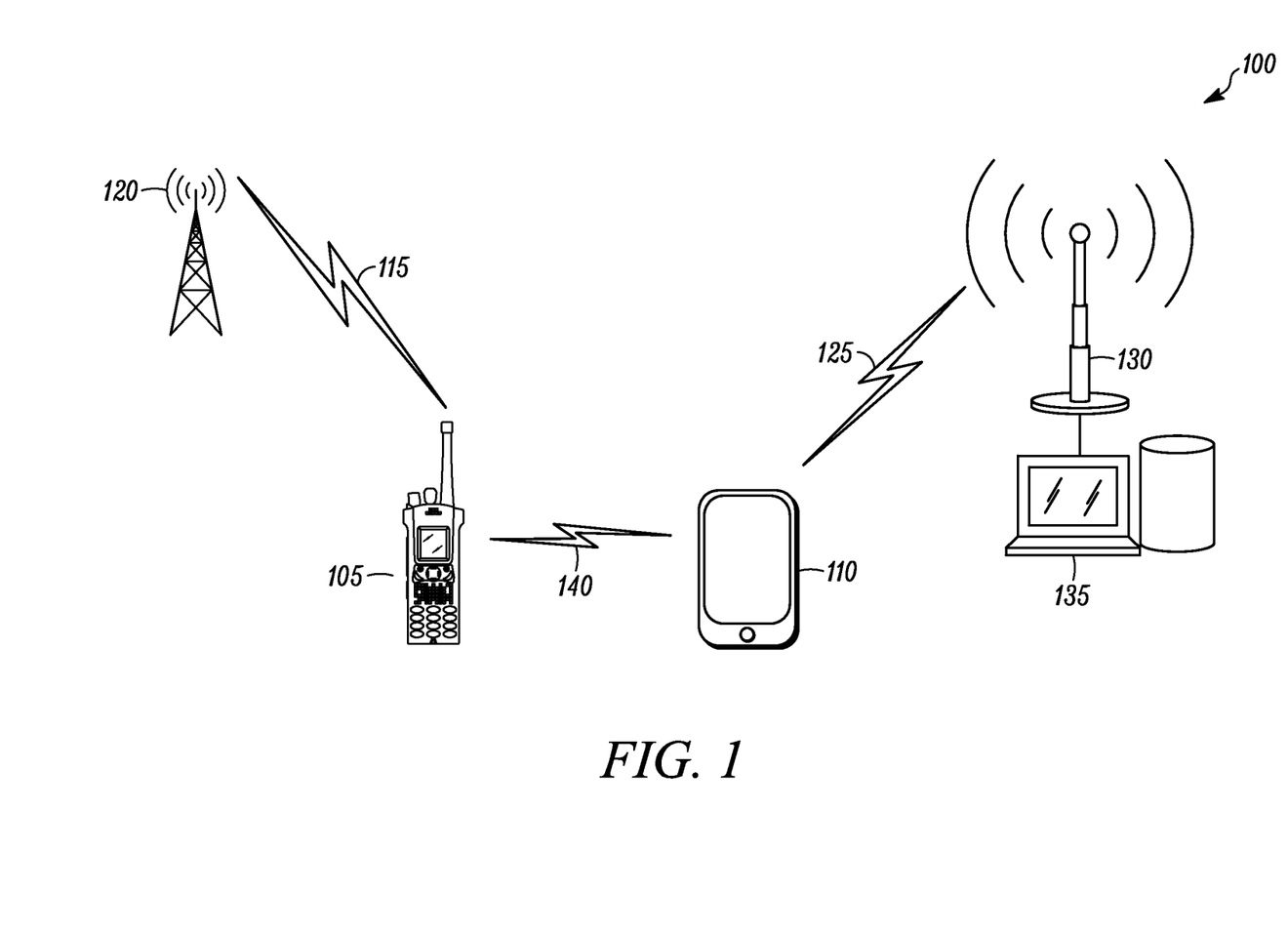
FIG. 1 is a schematic diagram illustrating a radio communication system, according to some embodiments.

FIG. 1 is a schematic diagram illustrating a radio communication system 100, according to some embodiments. The system 100 includes at least one narrowband device 105 and at least one broadband device 110. The narrowband device 105 is connected via a wireless link 115 to a narrowband network 120, and the broadband device 110 is connected via a wireless link 125 to a broadband network 130. The broadband network 130 is then connected to various extended infrastructure 135, including for example the Internet. Further the narrowband device 105 and the broadband device 110 are connected to each other via a personal area network (PAN) link 140.

For example, the narrowband network 120 may be a public safety network used by first responders such as police and fire personnel. The at least one narrowband device 105 and at least one broadband device 110 can provide a plurality of communication devices for a single user, such as a first responder. The devices 105, 110 may be, for example, handheld devices, devices worn on or about a user's body, or devices in a vehicle so as to be under the immediate control of the user.

An example of the narrowband device 105 is a dedicated Land Mobile Radio (LMR) of a system such as Project 25 (P25) or European Terrestrial Trunked Radio (TETRA) that operates using a Common Air Interface (CAI) call format. An example of the broadband device 110 is a conventional cell phone, and the wireless link 125 to the broadband network 130 can be established using private or public wireless networks such as 4G Long Term Evolution (LTE) networks or WiFi networks. The PAN link 140 connecting together the narrowband device 105 and the broadband device 110 can be established using various well known master-less wireless standards and protocols such as Bluetooth, WiFi, or ZigBee.

Advantages of some embodiments include an ability to quickly transfer a call from a first device to a second device, where both the first and second devices are operated by the same user, but where the second device has improved operating functionality regarding the transferred call. For example, the broadband device 110 operates as a partner device for expanding user interface elements to the narrowband device 105. Alternatively, the broadband device 110 can operate as a back-up device for push-to-talk and emergency communications originating from the narrowband device 105.

Thus, in one possible scenario the narrowband device 105 may be, for example, an LMR device of a police officer who is monitoring a dispatch channel for a local police department, and the broadband device 110 may be a cell phone of the same police officer that is monitoring call information and audio streams available over cellular or broadband via Rich Site Summary (RSS) syndication or similar data feeds from a statewide sheriffs system, which system is separate and independent of the system of the local police department. If the police officer is at an incident scene, where there may be significant background noise such as vehicle sirens or alarms, it can be very beneficial to utilize the superior audio and microphone capabilities of the officer's LMR device compared to the capabilities of the cell phone. Thus, according to some embodiments described herein a call that is first monitored on the cell phone can be quickly and effectively transferred to the LMR device.

Figure 2:
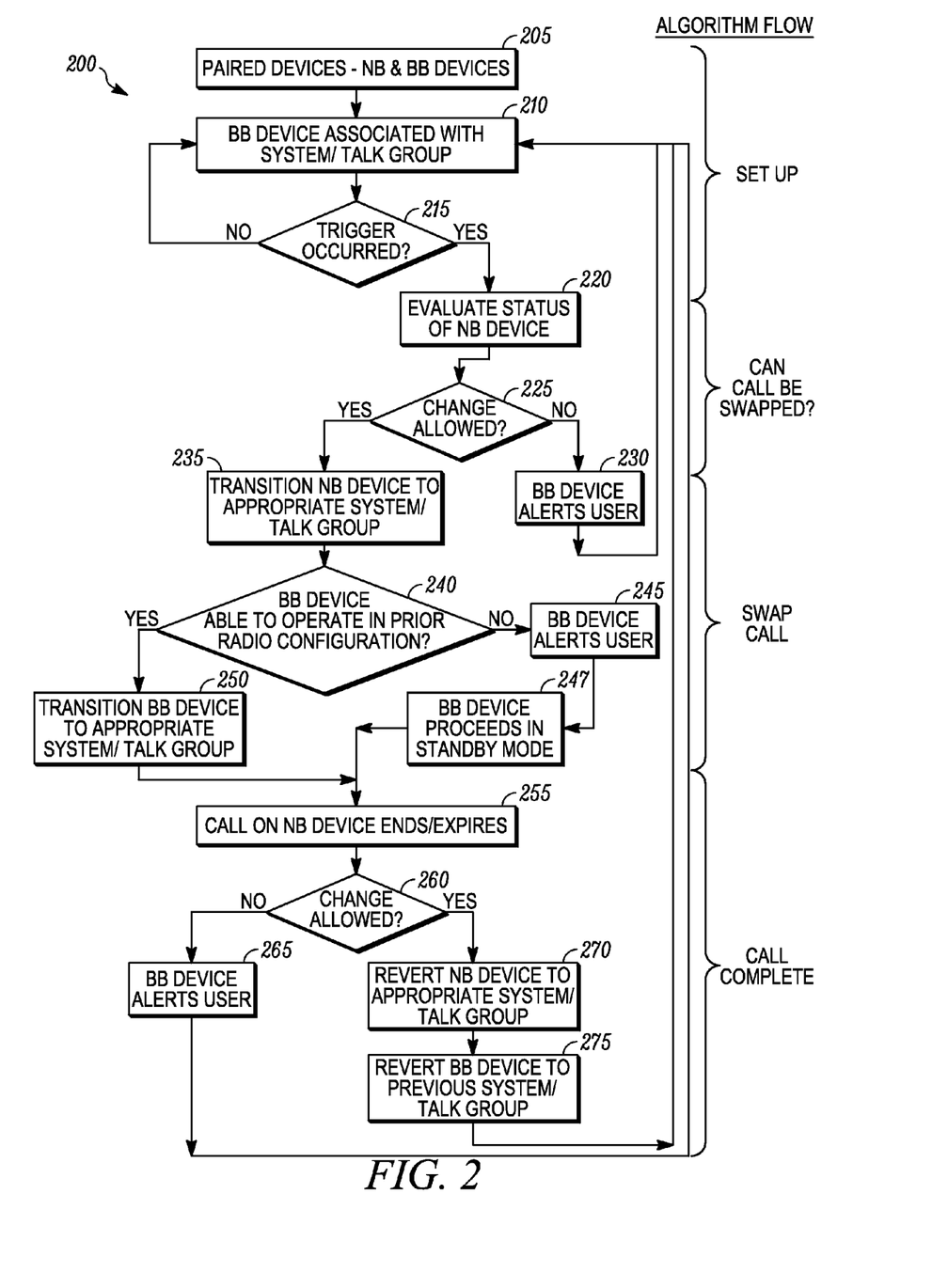
FIG. 2 is a flow diagram illustrating a method of transferring a call between a narrowband (NB) device and the broadband (BB) device, according to some embodiments.

FIG. 2 is a flow diagram illustrating a method 200 of transferring a call between the narrowband (NB) device 105 and the broadband (BB) device 110 according to some embodiments. At block 205 the devices 105, 110 are paired. For example, both devices 105, 110 may be carried by a police officer at an incident scene, and the devices 105, 110 are paired using Bluetooth. At block 210 the broadband device 110 is then associated with a particular channel or talk group.

At block 215 it is determined whether a triggering event has occurred. A triggering event is any event whereby a user of the devices 105, 110 may seek to transfer a call between the devices, 105, 110. For example, a police officer monitoring a channel on the broadband device 110 may choose to respond on that same channel, but using the Push To Talk (PTT) functionality, superior audio, noise cancelling techniques and superior microphone of the narrowband device 105. Manual or automated triggering events may be used, such as for example a physical button on either of the devices 105, 110, a sensor or accelerometer switch, or voice recognition.

After it is determined that a triggering event has occurred, at block 220 an operational status of the narrowband device 105 is evaluated. The operational status of the narrowband device 105 can include priority aspects of an operating mode, such that priority operation of the narrowband device 105 is not interrupted by transferring a call from the broadband device 110 to the narrowband device 105.

At block 225 it is determined whether a device change is allowed. The determination is based on factors such as the operational status of the narrowband device 105, on the ability of the narrowband device 105 to physically switch to the channel or talkgroup configuration of the broadband device 110, or the availability or authorization of the narrowband device 105 on the system or talkgroup configuration of the broadband device 110. For example, if the narrowband device 105 is operating in an emergency mode or is performing a priority scan, then it would be determined that the current operational status of the narrowband device 105 should take priority over a call transfer and the device change would not be allowed. Thus at block 230 the broadband device 110 would alert the user that the device change was disallowed.

If a device change is allowed, then at block 235 the narrowband device 105 transitions to the appropriate system, channel or talk group associated with the call transfer. For example, this may include a collaboration event between the narrowband device 105 and the broadband device 110 to share call details and call encryption keys to allow the user to immediately join a current PTT call that is in progress. The user can thus immediately participate in the PTT call using the narrowband device 105 and does not need to wait for a late entry to the PTT call.

At block 240 it is determined whether the broadband device 110 is able to operate in a prior radio configuration or whether the broadband network 130 is connected with the LMR system and talkgroup of the narrowband device 105. If not, at block 245 the broadband device 110 alerts the user and at block 247 the broadband device 110 proceeds in a standby mode. If so, at block 250 the broadband device 110 transitions to an appropriate new channel, system or talkgroup. For example, the new channel, system or talkgroup may have been pre-programmed as a default configuration of the broadband device 110.

At block 255 the call on the narrowband device 105 ends or expires. At block 260 it is then determined whether to allow a change on either or both of the narrowband device 105 and the broadband device 110. If not, at block 265 both the narrowband device 105 and the broadband device 110 continue operating in their current configurations. If so, at block 270 the narrowband device 105 reverts to an appropriate channel, system or talkgroup, and at block 275 the broadband device 110 reverts to an appropriate channel, system or talkgroup.

Figure 3:
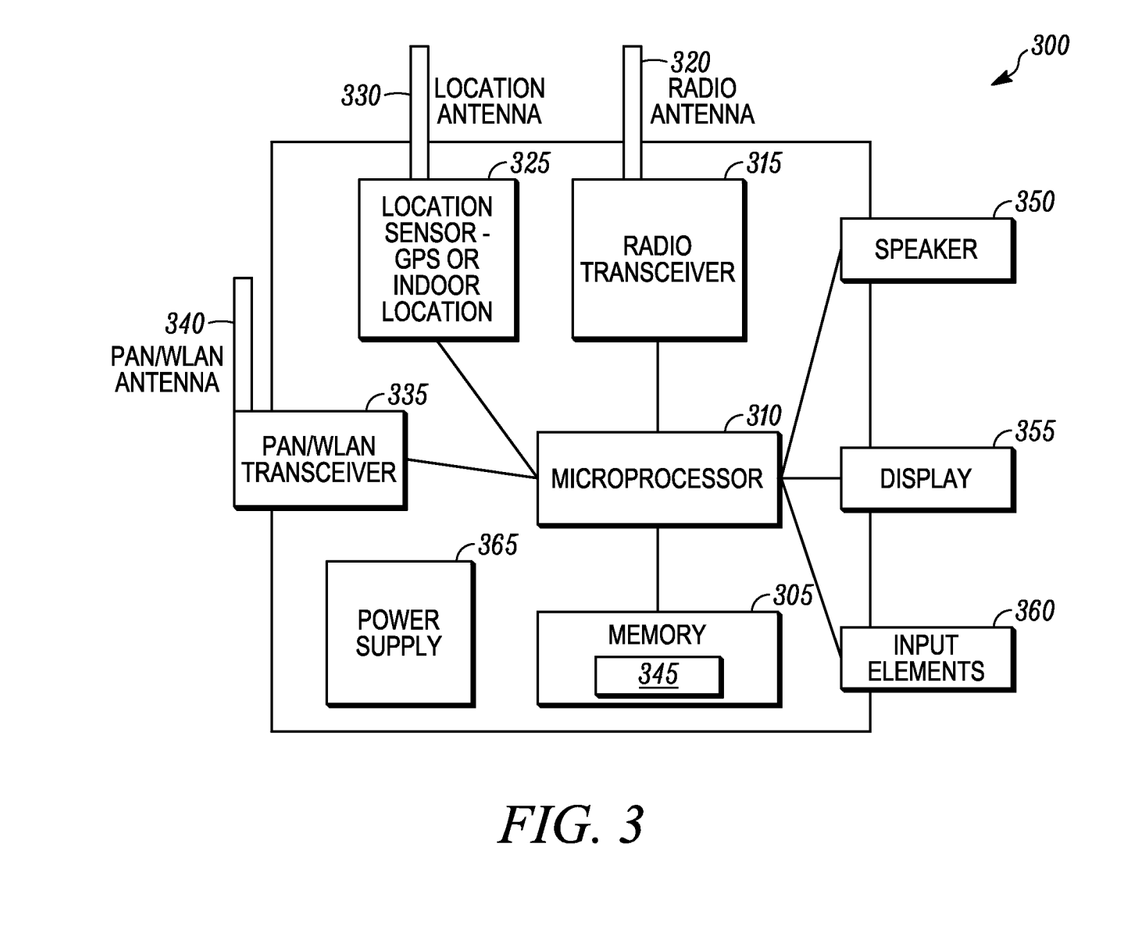
FIG. 3 is a block diagram illustrating components of a communication device, according to some embodiments.

FIG. 3 is a block diagram illustrating components of an embodiment of a communication device 300 according to some embodiments. For example, the narrowband device 105 and the broadband device 110 may each comprise similar components, architecture and capabilities as the communication device 300.

The device 300 comprises a memory 305 coupled to a microprocessor 310. The microprocessor 310 also has ports for coupling to a radio transceiver 315 having a radio antenna 320, a location sensor 325 having a location antenna 330, and a Personal Area Network (PAN)/Wireless Local Area Network (WLAN) transceiver 335 having a PAN/WLAN antenna 340. The location sensor 325 may include, for example, a Global Positioning System (GPS) location sensor or an indoor location sensor. In a narrowband device 105 the radio transceiver 315 communicates with a private narrowband network such as the narrowband network 120. In a broadband device 110 the radio transceiver 315 communicates with broadband infrastructure such as the broadband network 130.

The PAN/WLAN transceiver 335 enables two devices, such as the narrowband device 105 and the broadband device 110, to communicate with each other over a PAN or a WLAN using well known standards and protocols such as Bluetooth, WiFi or Zigbee. The PAN/WLAN transceiver 335 thus enables establishment of the PAN link 140 between the devices 105, 110, and transmission of call transfer details such as encryption keys.

Figure 4:
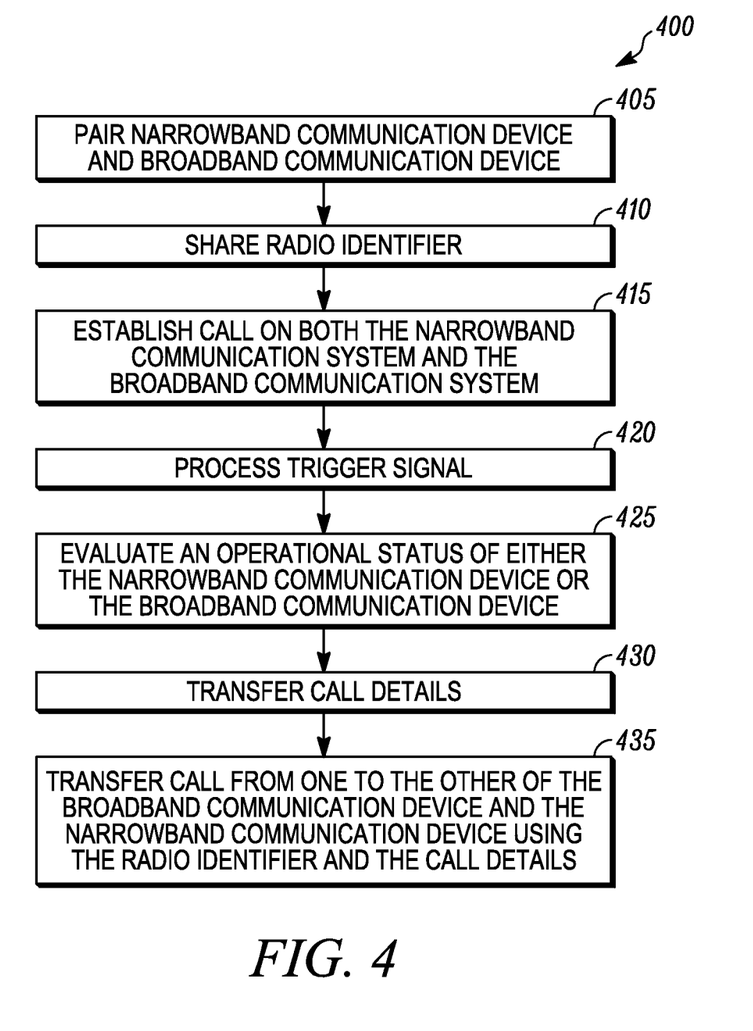
FIG. 4 is a flow diagram illustrating a method for transferring a call between devices of a single user, according to some embodiments Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The memory 305 can store operating code (OC) for the microprocessor 310 and code for performing functions associated with the narrowband device 105 or the broadband device 110. For example, the memory 305 can store computer readable program code components 345 configured to cause execution of a method, such as the method 400 described below, for transferring a call between devices of a single user as described herein.

The microprocessor 310 is also connected to user interface elements such as a speaker 350, a display unit 355, and input elements 360 such as a microphone and keypad. Further, a power supply 365 provides power to the device 300 under single user control.

Wireless portable electronic devices that utilize and benefit from embodiments of the present invention can utilize various types of wireless network architectures including a mesh enabled architecture (MEA) network, or an Institute of Electrical and Electronics Engineers (IEEE) 802.11 network (e.g., 802.11a, 802.11b, 802.11g, 802.11n). It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access). Embodiments of the present invention can then enable a call on such networks to be reliably transferred between devices such as the narrowband device 105 and the broadband device 110.

According to some embodiments, narrowband is defined as a limited-capacity transmission channel such as that used for transmitting low data rate audio signals or data signals. Examples of narrowband within a two-way radio environment include Private Land Mobile Radio (PLMR) devices that operate in a 25 kHz or 12.5 kHz bandwidth supporting voice or data operations.

According to some embodiments, broadband is defined as a high-capacity transmission technique using a wide range of frequencies, which enables a large number of messages to be communicated simultaneously.

FIG. 4 is a flow diagram illustrating a method 400 for transferring a call between devices of a single user, according to some embodiments. At block 405, a narrowband communication device operating in a narrowband communication system is paired over a master-less communication link with a broadband communication device operating in a broadband communication system. For example, the narrowband device 105 is paired with the broadband device 110 over a peer-to-peer network such as the PAN link 140 in an automated collaboration without user interaction.

At block 410, a radio identifier is shared between the narrowband communication device and the broadband communication device. For example, the narrowband device 105 and the broadband device 110 identify themselves over the PAN link 140.

At block 415, the call is established on both the narrowband communication system and the broadband communication system At block 420, a trigger signal is processed indicating that the call is to be transferred from one to the other of the broadband communication device and the narrowband communication device. For example, the user may manually press a button on the narrowband device 105 indicating that the call is to be transferred to the narrowband device 105 from the broadband device 110.

At block 425, in response to the trigger signal, an operational status of either the narrowband communication device or the broadband communication device is evaluated. For example, the broadband device 110 evaluates an operational status of the narrowband device 105 including priority aspects of an operating mode. That ensures that priority narrowband operation of the narrowband device 105 is not interrupted by transferring the call.

At block 430, call details are transferred between the narrowband communication device and the broadband communication device. For example, call details such as channel information and encryption keys are transferred between the narrowband device 105 and the broadband device 110 over the PAN link 140.

At block 435, the call is transferred from one to the other of the broadband communication device and the narrowband communication device using the radio identifier and the call details. For example, the call associated with the call details may have been prior established on both the narrowband communication system and the broadband communication system so that the call does not require a slow call forwarding process but instead can be immediately transferred.

Advantages of some embodiments thus include an ability to quickly transfer a call from a first device to a second device, where both the first and second devices are operated by the same user, but where the second device has improved operating functionality regarding the transferred call. For example, where the second device is a narrowband device such as an LMR device, it may have improved audio, noise cancelling, and microphone capabilities over a first device such as a cell phone. Further, according to some embodiments, no disruption occurs of mission critical priority aspects of the narrowband device, such as emergency calls and priority scanning, because an operational status of the narrowband device is evaluated before a call is transferred. Also, according to some embodiments, no server interaction is required when transferring a call because the call is already available both on the narrowband device (e.g., in a CAI format) and on the broadband device (e.g., in a 4G/LTE format).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a . . . ", "has a . . . ", "includes a . . . ", "contains a . . . " does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for transferring a call between devices of a single user, the method comprising:
   pairing, over a master-less communication link, a narrowband communication device operating in a narrowband communication system and a broadband communication device operating in a broadband communication system;
   sharing a radio identifier between the narrowband communication device and the broadband communication device;
   establishing the call on both the narrowband communication system and the broadband communication system;
   processing a trigger signal indicating that the call is to be transferred from one to the other of the broadband communication device and the narrowband communication device;
   evaluating, in response to the trigger signal, an operational status of either the narrowband communication device or the broadband communication device; and
   transferring call details between the broadband communication device and the narrowband communication device;
   wherein using the radio identifier and the call details, and based on the operational status, the call is transferred from one to the other of the broadband communication device and the narrowband communication device.

2. The method of claim 1, wherein the call is transferred from the broadband communication device to the narrowband communication device, and an operational status of the narrowband communication device is evaluated before the call is transferred.

3. The method of claim 2, wherein the operational status of the narrowband communication device includes priority aspects of an operating mode, and whereby priority narrowband operation is not interrupted by transferring the call.

4. The method of claim 1, wherein the broadband communication device operates as a partner device for expanding user interface elements to the narrowband communication device.

5. The method of claim 1, wherein the master-less communication link comprises a peer-to-peer network that provides automated collaboration between the narrowband communication device and the broadband communication device without user interaction.

6. The method of claim 1, wherein the trigger signal either is manually activated by the user or is automatically activated.

7. The method of claim 1, wherein the broadband communication device operates as a back-up device for push-to-talk and emergency communications originating from the narrowband communication device.

8. The method of claim 1, wherein the call is a frequency division multiple access (FDMA) based call.

9. The method of claim 1, wherein sharing the radio identifier between the narrowband communication device and the broadband communication device comprises the narrowband communication device sharing, with the broadband communication device, a radio identifier of the narrowband communication device, and wherein the broadband communication device utilizes the radio identifier of the narrowband communication device when communicating with a broadband network of the broadband communication system as a partner device of the narrowband communication device.

10. The method of claim 1, wherein the call details include Land Mobile Radio (LMR) details including call encryption keys.

11. A broadband communication device, comprising:
   a processor, and
   a memory operatively coupled to the processor, wherein the memory includes:
      computer readable program code components for pairing, over a master-less communication link, a narrowband communication device operating in a narrowband communication system and the broadband communication device operating in a broadband communication system;
      computer readable program code components for sharing a radio identifier between the narrowband communication device and the broadband communication device;
      computer readable program code components for establishing a call on both the narrowband communication system and the broadband communication system;
      computer readable program code components for processing a trigger signal indicating that the call is to be transferred from one to the other of the broadband communication device and the narrowband communication device;
      computer readable program code components for evaluating, in response to the trigger signal, an operational status of either the narrowband communication device or the broadband communication device; and computer readable program code components for transferring call details between the narrowband communication device and the broadband communication device, wherein using the radio identifier and the call details, and based on the operational status, the call is transferred from one to the other of the broadband communication device and the narrowband communication device.

12. The broadband communication device of claim 11, wherein the call is transferred from the broadband communication device to the narrowband communication device, and an operational status of the narrowband communication device is evaluated before the call is transferred.

13. The broadband communication device of claim 12, wherein the operational status of the narrowband communication device includes priority aspects of an operating mode, and whereby priority narrowband operation is not interrupted by transferring the call.

14. The broadband communication device of claim 11, wherein the broadband communication device operates as a partner device for expanding user interface elements to the narrowband communication device.

15. The broadband communication device of claim 11, wherein the master-less communication link comprises a peer-to-peer network that provides automated collaboration between the narrowband communication device and the broadband communication device without user interaction.

16. The broadband communication device of claim 11, wherein the broadband communication device operates as a back-up device for push-to-talk and emergency communications originating from the narrowband communication device.

17. The broadband communication device of claim 11, wherein the call is a frequency division multiple access (FDMA) based call.

18. The broadband communication device of claim 11, wherein the call details include call encryption keys.

19. A narrowband communication device, comprising:
a processor, and
a memory operatively coupled to the processor, wherein the memory includes:
   computer readable program code components for pairing, over a master-less communication link, the narrowband communication device operating in a narrowband communication system and a broadband communication device operating in a broadband communication system;
   computer readable program code components for sharing a radio identifier between the narrowband communication device and the broadband communication device;
   computer readable program code components for establishing a call on both the narrowband communication system and the broadband communication system;
   computer readable program code components for processing a trigger signal indicating that the call is to be transferred from one to the other of the broadband communication device and the narrowband communication device;
   computer readable program code components for evaluating, in response to the trigger signal, an operational status of either the narrowband communication device or the broadband communication device; and
   computer readable program code components for transferring call details between the narrowband communication device and the broadband communication device, wherein using the radio identifier and the call details, and based on the operational status, the call is transferred from one to the other of the broadband communication device and the narrowband communication device.

20. The narrowband communication device of claim 19, wherein the call is transferred from the broadband communication device to the narrowband communication device, and an operational status of the narrowband communication device is evaluated before the call is transferred.

21. A radio communication system, comprising:
a broadband device operating in a broadband network;
a narrowband device operating in a narrowband network;
a trigger signal being processed indicating that a call is to be transferred from one to the other of the broadband communication device and the narrowband communication device;
the broadband device and the narrowband device being paired, over a masrer-less communication link, and over master-less the link:
   an operational status of either the broadband communication device or the narrowband communication device is evaluated in response to the trigger signal;
   a radio identifier being shared between the narrowband communication device and the broadband communication device for enabling call details to be transferred between the narrowband communication device and the broadband communication device; and
   the call being transferred from one to the other of the broadband communication device and the narrowband communication device based on the radio identifier, the call details, and operational status.

* * * * *